(12) United States Patent
Taghezout et al.

(10) Patent No.: US 9,746,831 B2
(45) Date of Patent: Aug. 29, 2017

(54) REGULATING BODY FOR A WRISTWATCH

(71) Applicant: Richemont International SA, Villars-sur-Glane (CH)

(72) Inventors: Daho Taghezout, Morges (CH); Willy Meier, Fontaines (CH); Alexandre Michalet, Chaux-des-Pres (FR); Kurt Straumann, Langendorf (CH)

(73) Assignee: Richemont International SA (CH)

( * ) Notice: Subject to any disclaimer, the term of this patent is extended or adjusted under 35 U.S.C. 154(b) by 183 days.

(21) Appl. No.: 14/649,512

(22) PCT Filed: Dec. 10, 2013

(86) PCT No.: PCT/EP2013/076138
§ 371 (c)(1),
(2) Date: Jun. 3, 2015

(87) PCT Pub. No.: WO2014/090830
PCT Pub. Date: Jun. 19, 2014

(65) Prior Publication Data
US 2015/0316894 A1     Nov. 5, 2015

(30) Foreign Application Priority Data

Dec. 11, 2012 (CH) .................................. 2770/12

(51) Int. Cl.
| | |
|---|---|
| G04C 3/16 | (2006.01) |
| G04C 3/06 | (2006.01) |
| G04C 10/00 | (2006.01) |
| H02P 3/22 | (2006.01) |
| H02P 8/16 | (2006.01) |

(52) U.S. Cl.
CPC .............. G04C 3/165 (2013.01); G04C 3/064 (2013.01); G04C 10/00 (2013.01); H02P 3/22 (2013.01); H02P 8/16 (2013.01)

(58) Field of Classification Search
CPC ....................................................... G04C 3/165
USPC ....................................................... 318/3, 34
See application file for complete search history.

(56) References Cited

U.S. PATENT DOCUMENTS

| | | |
|---|---|---|
| 3,654,757 A | 4/1972 | Takamune |
| 3,937,001 A | 2/1976 | Berney |
| (Continued) | | |

FOREIGN PATENT DOCUMENTS

| | | |
|---|---|---|
| CH | 597636 B5 | 4/1978 |
| EP | 0 239 820 A1 | 10/1987 |
| | (Continued) | |

OTHER PUBLICATIONS

International Search Report for PCT/EP2013/076138 dated May 8, 2014.

*Primary Examiner* — David S Luo
(74) *Attorney, Agent, or Firm* — Blank Rome LLP

(57) ABSTRACT

Regulating body for a wristwatch, comprising: a generator provided with a rotor and a stator with M+N coils, M being a whole number higher than, or equal to, 1; and an electronic regulating circuit having a first load impedance with an adjustable value for adjusting the current in N of said M+N coils, and therefore the rotational speed of the rotor. Only a limited number of coils is therefore used for the braking, the other coils continuing to supply the electronic regulating circuit.

22 Claims, 4 Drawing Sheets

(56) References Cited

U.S. PATENT DOCUMENTS

| | | | |
|---|---|---|---|
| 5,111,091 A * | 5/1992 | Bahn | H02P 25/089 310/166 |
| 5,517,469 A | 5/1996 | Wiget | |
| 5,637,974 A * | 6/1997 | McCann | H02P 25/0925 318/400.17 |
| 6,041,022 A | 3/2000 | Tu et al. | |
| 6,124,649 A | 9/2000 | Schafroth | |
| 6,194,878 B1 | 2/2001 | Schafroth | |
| 6,208,119 B1 | 3/2001 | Schafroth | |
| 6,714,487 B2 | 3/2004 | Schafroth et al. | |
| 7,307,922 B2 * | 12/2007 | Hiraya | G04C 10/00 368/140 |
| 8,072,166 B2 * | 12/2011 | Takeuchi | H02K 21/16 310/179 |
| 2005/0041535 A1 | 2/2005 | Iiiraya | |

FOREIGN PATENT DOCUMENTS

| | | |
|---|---|---|
| EP | 0 679 968 A1 | 11/1995 |
| EP | 0 816 955 A1 | 1/1998 |
| EP | 0 851 322 A1 | 7/1998 |
| EP | 0 905 589 A2 | 3/1999 |
| EP | 1 048 989 A1 | 11/2000 |
| EP | 1 143 307 A1 | 10/2001 |
| WO | WO 98/27473 | 6/1998 |
| WO | WO 00/63749 | 10/2000 |

\* cited by examiner

REGULATING BODY FOR A WRISTWATCH

RELATED APPLICATIONS

This application is a national phase of PCT/EP2013/076138, filed Dec. 10, 2013, which claims the benefit of CH 2770/12, filed Dec. 11, 2012. The entire contents of those applications are incorporated herein by reference.

TECHNICAL FIELD

The present invention concerns a regulating member for a wristwatch, notably an electronic regulating member for a mechanical wristwatch.

STATE OF THE ART

Mechanical wristwatches are usually regulated by means of an assembly comprising a spiral and a balance. The precision that can be achieved by means of a regulator member of this type, however, is limited.

Electronic watches are usually regulated by means of a quartz oscillator. The accuracy that can be achieved is greater than that of mechanical movements, but these watches usually require a battery that needs to be replaced periodically.

In order to overcome these drawbacks, the state of the art also knows watches that comprise a mechanical movement regulated by an electronic circuit with a quartz oscillator. The energy required for the electronic circuit is supplied by a microgenerator driven by the movement.

Thus, CH-A-597636 (Ebauches S. A.) proposes a mechanical movement with a barrel spring and a generator. The spring actuates, by means of a gearing, a time indicator and the generator that supplies an alternating voltage. The generator powers a rectifier that charges a storage capacity in order to power a quartz oscillator as well as an electronic regulating circuit. The electronic regulating circuit comprises a logical comparison circuit and an energy dissipation circuit connected to the output of the logical comparison circuit, whose power absorption can be controlled by the logical comparison circuit. An input of the logical comparison circuit is connected to the reference circuit and another input of the logical comparison circuit is connected to the generator. Depending on the result of this comparison, the logical comparison circuit controls the power absorption by the energy dissipation circuit and thus regulates, by means of controlling the regulating circuit's energy absorption, the running of the generator and of the time indicator.

In such a watch, the advantages of a mechanical watch, i.e. the absence of batteries, are combined with the accuracy of a quartz watch.

EP-A-0239820 and EP-A-679968 describe different electronic circuits to control the speed of a microgenerator in which a control circuit continuously monitors the angular position of the rotor and brakes it as soon as its angular position is in advance. Due to their sensitivity to errors and phase variations of the components, these circuits are difficult to adjust.

EP816955, the contents whereof are incorporated by reference, describes an improvement over the electronic circuits controlling watch microgenerators, wherein the voltage rectifier comprises transistors controlled by comparators to replace the diodes after the circuit has started.

EP0851322 describes a microgenerator for watch movement comprising a stator with three electrically connected coils and a rotor provided with magnetized areas. The coils are placed in an asymmetric manner around the shaft of the rotor in order to facilitate assembly.

WO0063749, the contents whereof are incorporated by reference, describes a watch movement with a microgenerator. In order to avoid the accumulation of electric charges, the wheels and the geartrain pinions are electrically grounded (connected electrically to the plate) and made of a non-magnetic material.

EP905589 describes a braking circuit for a microgenerator for a clockwork, comprising a counter and a braking circuit that brakes as soon as the value accumulated in the counter exceeds a threshold.

Modifying the load impedance connected to the microgenerator coils generally effects the braking of the microgenerator of this type of circuit. In some circuits functioning in all-or-nothing mode, the coils are short-circuited by means of braking pulses in order to apply a brutal braking during brief instants. The sudden accelerations and decelerations applied result in an inefficient use of the available energy. Other braking circuits consequently propose a progressive braking by varying the value of the load impedance between several discrete values.

Braking circuits known in this type of application, however, have the disadvantage of reducing the voltage available at the terminals of the stator coils during braking. The problem is particularly crucial when the microgenerator is sized to turn too quickly and has to be braked and regulated permanently. In this case, the braking permanently reduces the voltage generated and it becomes difficult to guarantee sufficient voltage for powering the electronic circuit for regulating the running of the generator. This results in the paradoxical situation that when the generator turns too fast, by reason of an abundance of mechanical energy for making the rewinding mass oscillate, the electric voltage available for powering the electric circuit diminishes, to the point where this circuit sometimes risks stopping.

US20050041535 describes a braking circuit for a microgenerator for clockwork comprising a rectifier circuit that can switch from a simple alternating mode to a double alternating rectifier, with the result of increasing incrementally the voltage available at the rectifier's output, of increasing the induced current and of slowing the rotor. The switching of the rectifier's operation mode, however, causes sudden variations of the braking torque applied to the generator, which is unfavorable to an efficient use of the available energy.

BRIEF SUMMARY OF THE INVENTION

One aim of the present invention is to propose an electronic regulating member for a wristwatch that is free from these limitations.

In particular, one aim of the present invention is to propose an electronic regulating member for a wristwatch that continues to supply a sufficient electric voltage even when the generator turns quickly and must be braked energetically or over a long duration.

According to the invention, these aims are achieved notably by means of a regulating member for a wristwatch, comprising:

a generator provided with a rotor and a stator with M+N coils, M and N being a whole number higher than, or equal to, 1; and an electronic regulating circuit arranged for controlling the braking of the rotor, wherein the circuit is arranged for controlling the braking exerted by the M coils differently from the braking exerted by the N coils.

In one embodiment, only N coils are used for controlling the variable braking applied to the rotor, whilst the other M coils are not used for braking, or in any case for controlling the braking. This solution has the advantage of braking only on N coils and of permanently keeping at least M coils for powering the electronic regulating circuit, even in the event of maximum braking. It is thus possible to avoid sudden voltage drops due to the simultaneous short-circuiting of all coils, to simplify the electronics and/or to achieve greater operating flexibility by enabling, for example, different braking strategies to be used.

M is preferably greater than or equal to two. N is preferably greater than or equal to two. M and N are preferably both greater than or equal to two. In another embodiment, M is greater than or equal to two whilst N is equal to one. In another embodiment, N is greater than or equal to two whilst M is equal to one.

In one embodiment, a first variable-value load impedance Z1 is connected to the N coils. The braking intensity exerted by the N coils depends on the value of this impedance, which thus determines the rotational speed and advance of the rotor.

In one embodiment, a second fixed-value load impedance Z2 is connected to M said coils. The second fixed-value load impedance Z2 can be constituted by a discrete impedance, for example a discrete impedance or one integrated in an integrated circuit. The second fixed-value load impedance Z2 can also be constituted, at least partly, by the input impedance of the electronic regulating circuit.

In one embodiment, a first variable-value load impedance Z1 is connected to the N coils and a second variable-value load impedance Z2 is connected to the other M coils. The value of the impedance Z1 is controlled independently of the value of the impedance Z2, so as to control individually the braking exerted by the M coils and the braking exerted by the N coils. In one example, the braking applied by the M coils is controlled but less than the braking applied by the N other coils, so as to ensure sufficient electric powering even in the event of maximum braking.

In one embodiment, the coils are distributed in more than two groups, wherein each group is connected to a fixed or variable impedance. One or several groups of coils, or even all the groups, are connected to a variable impedance in order to control individually the intensity of the braking exerted by each of these groups. One or several coil groups is connected to a fixed impedance or to a variable impedance but of high value, so as to guarantee sufficient electric powering even in the event of maximum braking.

In one embodiment, each coil is connected to a variable non-shared impedance, whose intensity is controlled independently of the intensity of the impedances connected to the other coils, so as to control independently the braking exerted by each coil.

The intensity of the braking exerted by the N+M coils depends on the value of their impedance, which thus determines the rotation speed and the advance of the generator.

The invention also concerns a regulating member for a wristwatch comprising a rotor and stator with M+N coils, wherein the number of coils used for controlling the braking is lower than M+N.

The N coils used for controlling the braking are preferably connected serially to one another and they are directly connected in parallel with the first adjustable-value load impedance Z1. The first adjustable-value load impedance Z1 can be connected upstream of the electronic regulating circuit. Thus, the braking is particularly efficient, even if it is performed only with N coils, because these coils can be directly short-circuited, without losses in an intermediary circuit.

The second load impedance Z2 having fixed value can be traversed by a current determined by the M+N coil assembly. The second load impedance Z2 having fixed value can be connected downstream of the electronic regulating circuit. Thus, the total voltage available at the terminals of the M+N coils in series is available for powering the electronic regulating circuit.

The adjustable-value load impedance can be executed with one or several fixed impedances whose connections in series and/or in parallel can be modified so as to adjust the total resulting impedance. The adjustable-value load impedance can also comprise one or several components whose value can be controlled.

The electronic regulating circuit can comprise a rectifier and a voltage multiplier.

The electronic regulating circuit can comprise a quartz oscillator, a system for counting the pulses generated from the quartz oscillator and pulses of the generator, and a system for controlling the first load impedance Z1 in order to adjust the value of the first load impedance Z1 according to the counting system.

It is also possible to adjust the value of the second load impedance Z2 independently of Z1 and/or the total value of the impedances Z1+Z2, according to the counting system.

The system for counting pulses of the generator can count the pulses from the signals at the terminals of the M+N coils. The system for counting pulses of the generator can count the pulses from the signals at the terminals of the M coils that are never short-circuited. The system for counting pulses of the generator can count the pulses from the signals at the terminals of part of the M coils that are never short-circuited.

The first adjustable-value load impedance Z1 comprises several discrete impedances that can be selected individually in order to control the value of the first load impedance Z1 between several discrete values.

In one embodiment, the generator comprises M+N coils of which only N can be short-circuited. The M other coils can be connected to a fixed load impedance. Only the N coils remaining serve for braking. In this manner, the average alternative voltage available at the terminals of the electronic regulating circuit remains sufficient even during braking, as long as the rotor continues to turn at a sufficient speed.

Different variant embodiments can be imagined. For example, the number of coils assigned to braking or the number of coils assigned only to generating the electric current can vary. It is possible to use a variable number N of coils assigned to braking. In this case, a variable braking intensity can be achieved by modifying the number of coils assigned to braking, even if the first load impedance remains fixed. For example, when the tension accumulated in a storage capacity is considerable and the generator continues to turn too quickly, it is possible to increase the number of coils used for braking. Inversely, it is possible to reduce the number of coils assigned to braking during startup or when the generator turns too slowly.

It is thus possible to control the intensity of braking by controlling the number N of coils assigned to braking. A weak braking can be achieved by braking with a number N of coils assigned to braking; a greater braking torque can be achieved by increasing the value of N in order to brake using more coils.

It is possible to modify the allocation of the coils. A first group of coils can be used in the first instants for braking and in second instants only for the production of electric current. A second group of coils can be used in these first instants for the production of electric current and in these second instants for braking.

It is possible to brake with different braking intensities on different coils or groups of coils. A first group of coils can be connected to a first adjustable load impedance Z1. A second group of coils can be connected to a second adjustable load impedance. The value of the first adjustable load impedance Z1 can be different from the value of the second adjustable load impedance. The electronic regulating circuit can control the first load impedance Z1 and the second load impedance so as to brake with a different braking intensity on the first group of coils and on the second group of coils. It is possible to use a first group of coils for a powerful braking, by connecting these coils with a first impedance. It is possible to use a second group of coils for a weaker braking, by connecting these coils with a second impedance having a value greater than the first impedance.

It is possible to brake during different durations of braking on different coils or groups of coils. A first group of coils can be connected to a first load impedance Z1. A second group of coils can be connected to a second load impedance. The duration of the braking by means of the first load impedance can be different from the duration of braking by means of the second load impedance. The electronic regulating circuit can control the value and/or the connection of the first load impedance and/or of the second load impedance so as to brake during different braking instants or durations on the first group of coils and on the second group of coils. It is possible to use a first group of coils for a powerful braking, by applying a braking during a first duration on this first group of coils, and to use a second braking group for a weaker braking, by applying on these coils a braking during a second duration shorter than the first duration.

It is possible to provide more than two groups of coils and more than two load impedances. For example, it is possible to provide a first group of coils assigned to the powerful braking, a second group of coils assigned to the moderate braking, and a third group of coils assigned only to the production of electric current to power the electronic regulating circuit.

In all the embodiments above, the braking coils can also be used for electrically powering the electronic regulating circuit, at least when they are not entirely short-circuited.

According to an independent characteristic of the invention, the braking applied onto the at least one coil is intermittent. The braking applied on N of the M+N coils can be intermittent. The braking applied on all the coils can be intermittent. The intermittent braking can be combined with the use of M+N coils of which only N are assigned to controlling the braking. The intermittent braking can also be applied with regulating members in which all the coils exert an identical braking. The intermittent braking can be applied with regulating members in which all the coils are used for controlling the intensity of braking.

Thus, the invention also has as its object a regulating member for a wristwatch, comprising:
- a generator provided with a rotor and a stator with M+N coils, M and N being each a whole number greater than or equal to 1; and
- an electronic regulating circuit arranged for controlling the braking of the rotor by applying braking cycles, wherein each cycle comprises a first braking period with a fixed braking intensity and a second braking period with a braking intensity depending on the advance of the generator.

The intermittent braking can be achieved by interrupting the braking during the first period of a duration T1, then by reestablishing it during a second period of a duration T2. The total duration of the cycle T1+T2 can be set, preferably at 1 second, or at any other value. The regulating member can comprise an electronic regulating circuit, for example an electronic regulating circuit as described in the remainder of this document, arranged for varying the total duration T1+T2 depending on the energy available in the barrel and thus the running reserve.

In one embodiment, the total duration of the cycle T1+T2 can take on a plurality of values, for example a plurality of discrete values, depending on the energy available in the barrel. The electronic regulating circuit is arranged for indicating the running reserve by varying the duration of said cycle depending on the energy available in a barrel. For example, a nearly discharged state of the barrel can be indicated to the user by increasing considerably the duration of the cycles, for example by increasing it up to a value of 3, 5 or 10 seconds, which causes an irregular displacement, by fits and starts, of the seconds hand on the dial. A charged barrel is indicated by means of short cycles causing a regular displacement of the hand, whilst a more discharged barrel can be indicated by means of longer cycles causing a more irregular displacement of the hand. Tests have shown that such a displacement, in fits and starts, proves surprisingly more economical in terms of energy than an operation with constant braking.

It is possible to provide braking cycles comprising more than two distinct periods, for example braking cycles comprising more than one braking period and/or more than one period of non-braking or of constant braking.

The duration T1+T2 of the cycles can be reduced when the watch runs in chronograph mode, in order to enable an accurate measurement of brief durations.

The braking intensity can be controlled by varying at each cycle the braking intensity applied during the second braking period of duration T2. Alternatively, or furthermore, the intensity of braking can be controlled by varying the duration T2, or the ratio between the duration T1 and the duration T2. Alternatively, or furthermore, the intensity of braking can be controlled by modifying the number of braking coils.

The intensity of braking can depend on the advance of the generator, determined by means of a counter such as described in the remainder of the application and which integrates the difference between the number of pulses originating from a quartz oscillator and the number of pulses coming from the generator.

The different embodiments above can be combined with one another when they do not exclude each other.

In the present application, the expression "short-circuiting" means "reduce the impedance to a value close to zero, but not necessarily equal to zero". For example, a coil will be considered short-circuited if the load impedance connected to its output is such that the voltage at the terminals of the coil falls to a level very clearly lower (for example less than 1 percent) of the induced voltage in open circuit, i.e. when the load impedance is infinite.

BRIEF DESCRIPTION OF THE FIGURES

Examples of embodiments of the invention are indicated in the description illustrated by the attached figures in which.

EXAMPLE(S) OF EMBODIMENTS OF THE INVENTION

Figure 1:
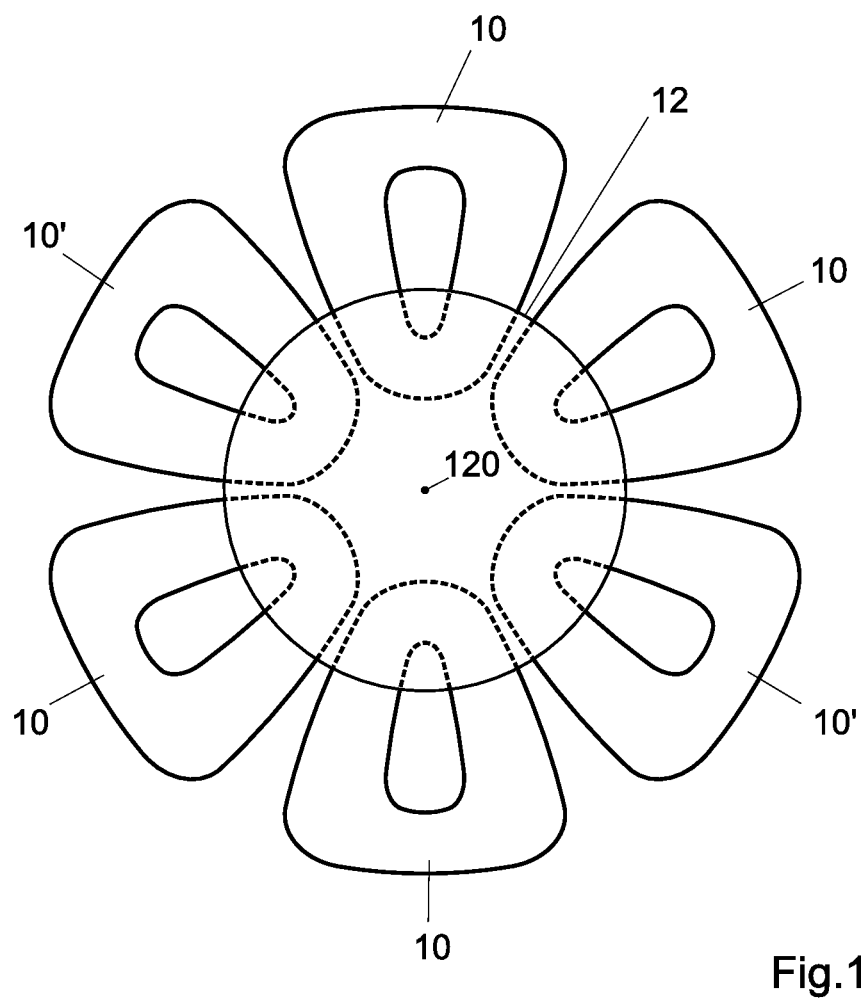
FIG. 1 illustrates diagrammatically a generator according to one embodiment of the invention.

The regulating member for a wristwatch comprises a generator illustrated diagrammatically in FIG. 1. The generator of this example comprises a rotor 12 mounted on the arbor 120 of a pinion or of a wheel (not represented) connected to the geartrain of a mechanical movement (not represented) whose speed it regulates. The rotor 12 comprises a plate with magnetic portions, not represented, for example discrete magnets or magnetized portions, that generate a rotating magnetic field when the rotor is driven in rotation by the geartrain of a mechanical movement. In one variant, it is also possible to provide a rotor with several plates, for example a rotor with two coaxial plates superimposed one above the other.

The generator further comprises a stator with coils 10, 10' placed so that the rotating magnetic field generated by the rotation of the rotor 12 induces induced voltages in the coils. The figure illustrates a construction with six coils spread angularly in a roughly regular manner. The number of coils can be different. In the case of a rotor with two plates, the coils are advantageously mounted on a printed circuit, for example a PCB, passing through the two rotor plates.

The coils 10, 10' of this example have a roughly ovoid or roughly trapezoidal shape, so that their section increases when moving away from the center of the generator. This particular shape enables the coils to be placed as closely together as possible near the center whilst taking advantage of the improved coupling provided thanks to the greater section of the coils on the outside. The ovoid shape can for example be achieved by a coiling process in which the coiling tension is modified at each half turn, so as to tighten the spires on the inside more than on the outside. This ovoid shape can also be used in clockwork generators used with any kind of electronic regulating circuits, for example circuits such as described in the remainder of this application, or different circuits.

Other types of generators can be used in the frame of this invention, including the generator described in EP-B1-851322 or that described in EP-B1-1171806, the contents of both applications being hereby included by reference.

Figure 2:
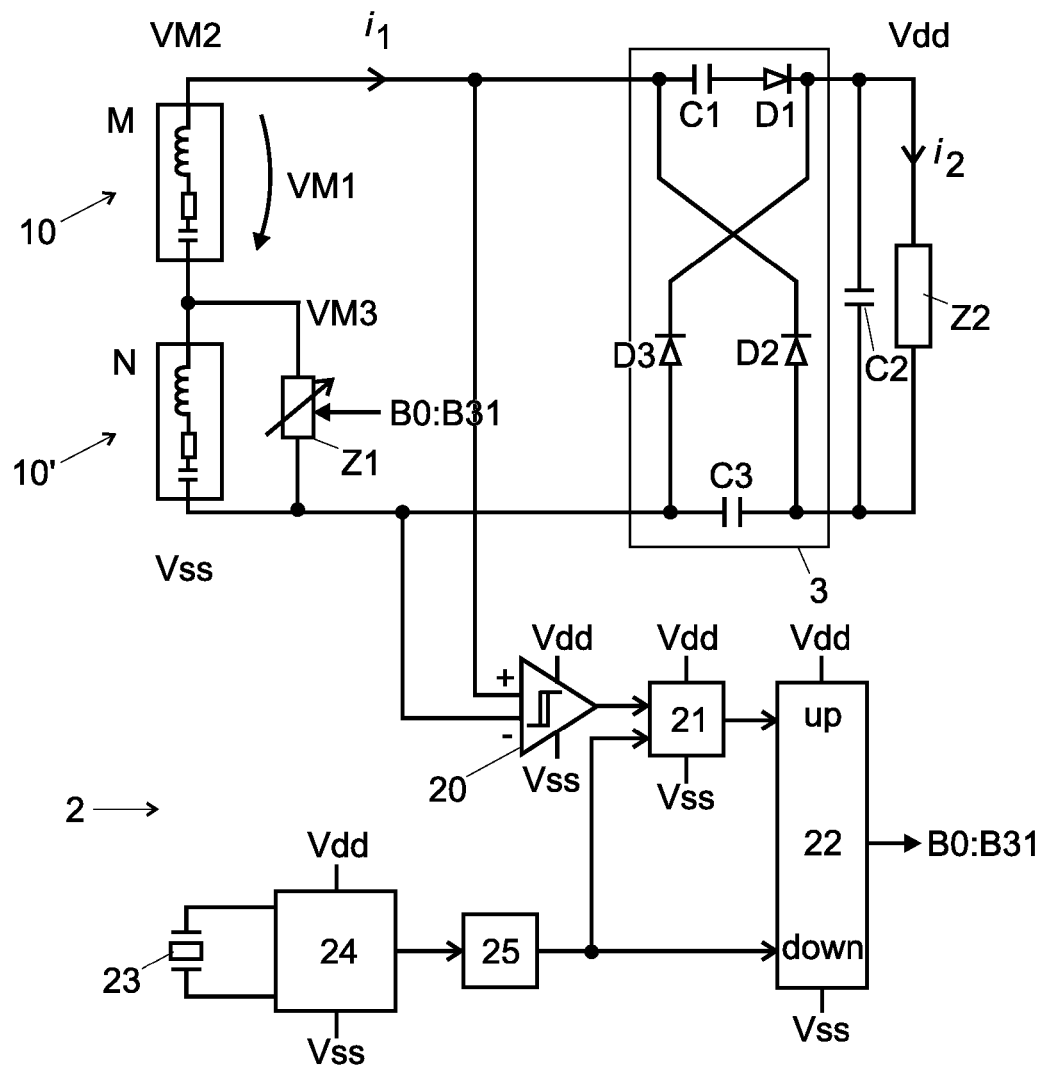
FIG. 2 is a simplified electric diagram of the electronic circuit according to one embodiment of the invention.

FIG. 2 illustrates a simplified electric diagram of the electronic circuit 2 for regulating the rotation speed of the rotor according to the invention. A certain number of elements of this circuit can be identical to those of EP-B1-1276024, the content of which is hereby included by reference. Most of the elements of this circuit, with the exception of the coils 10, 10', of the quartz 23 and possibly of the capacity C2, can be executed in the form of an integrated circuit, for example an asic circuit.

The electric coils 10, 10' of the stator described further above are connected serially and grouped in two groups. The group comprising the coils 10' can for example comprise N=2 coils designed for braking and powering electrically the electronic circuit. The group comprising the coils 10 can for example comprise M=4 coils designed solely to powering electrically the electronic circuit.

The element Z1 is a variable-value load impedance, in this embodiment a simple resistor, connected in parallel with the N coils 10' designed for braking. One example of embodiment of the impedance Z1 is illustrated and will be described further below in relation with FIG. 4. In one embodiment, the load impedance Z1 comprises several resistors 910-916 with a variable value connected in parallel. Switches 901-906 are provided in each branch of the circuit and can be selected individually by means of a digital signal B0-B31 determined at each instant by the circuit in order to adapt the intensity of braking to the speed or the advance of the rotor.

The element 3 is a rectifier-cum-voltage-multiplier circuit that enables the alternating voltage at the terminals of the M+N coils to be converted into a continuous and multiplied voltage $V_{dd}$ that is stored in the storage capacity C2 and powers the whole of the electronic circuit. The circuit represented is based on the use of diodes D1-D3 and of capacitors C1 and C3 for rectifying and multiplying the current. In order to prevent voltage drops in the diodes, they can advantageously be replaced, after startup, by transistors controlled by comparators comparing the voltage value upstream and downstream of the diode, according to the process described in EP-B1-1276024.

The capacity C2 is a storage capacity of relatively high value that enables the voltage at the output of the rectifier 3 to be maintained at a level $V_{dd}$ approximately constant, even when the voltage induced in the coils 10, 10' fluctuates.

The impedance Z2 is a load impedance, in this example a simple resistor, of preferably fixed value, connected to the M power supply coils 10 and in this embodiment also, connected to the N braking coils 10'. "Connected" in this context means that a variation of the load impedance Z2 would influence the current generated by the M+N coils, or, in other words, that the current passing through this load impedance Z2 depends on the voltage induced by the M+N coils 10, 10'. The term "fixed" in this context means that the value of the impedance Z2 is not adjustable and that it is not adjusted deliberately; variations of this impedance can however occur during use.

This impedance Z2 can be constituted by a discrete component, by an integrated circuit, or can possibly be constituted by the input impedance of the electronic regulating circuit 2.

The load impedances Z1, Z2 illustrated in FIG. 2 are simple resistors. Other types of impedances, including impedances comprising capacitive or inductive components, can be used.

The element 20 is a hysteresis comparator that compares at each instant the voltage VM2 at the terminals of the M+N coils 10, 10' and generates a rectangular signal that changes direction at each polarity inversion. Ascending and/or descending flanks of this rectangular signal can thus be used as pulses whose rhythm determines the rotation frequency of the rotor 12. In one variant embodiment, the comparator 20 could compare the voltage VM1 at the terminals of the coils 10 that are not braked, or at the terminals of a portion of these un-braked coils.

The element 23 is a quartz forming with the oscillator 24 a reference oscillator whose frequency of the output signal is divided by the frequency divider 25 in order to correspond with the rotation speed at which the rotor 12 is to be set. The output signal "down" at the output of this frequency divider is supplied at the decrementation input of a bidirectional counter 22.

The element 21 is an anti-coincidence circuit that enables the pulses at the output of the comparator 20 to be shifted relative to the pulses at the output of the frequency divider 25 when these two pulses occur at the same instant. The output signal "up" at the output of this anti-coincidence circuit 21 is supplied at the incrementation input of the bidirectional counter 22.

The bidirectional counter 22 stores a binary value B0:B31 that is incremented at each "up" pulse coming from the generator, and decremented at each "down" pulse coming from the quartz oscillator 23, 24. Thus, the value of this counter increases when the generator turns too fast relative to the reference signal given by the quartz, and diminishes when it turns less fast. This signal B0:B31 is used to adjust the value of the variable impedance Z1 and thus for adjusting the braking torque.

A logic, not represented, can be provided at the output of the counter 22, or as part of this counter, in order to adjust the digital signal B0:B31 and thus the braking intensity according to a linear or preferably non-linear ratio relative to the counted value. For example, in order to avoid momentary voltage drops, it is possible to eliminate any braking when the rotor 12 of the generator 10, 12 turns very slowly, even if it is in advance relative to the quartz oscillator signal, in order to quickly reach the voltage value allowing the circuit to be powered. The braking torque applied can for example comprise a component proportional to the momentary speed difference, to the derivation of this difference and/or to the integral of this difference. A massive braking can furthermore be provided in case of excessive speed or, on the contrary, of exceedingly slow speed, in order to stop the watch when the indications displayed risk being incorrect. The braking is preferably interrupted in the startup phase, in order to make the rotor turn in free rotation and reach as quickly as possible an induced voltage sufficient for powering the electronics.

The braking is thus performed only by means of the N coils 10' that are connected to the variable load impedance Z1 whose value decreases when the value counted by the counter 22 increases, in order to brake the generator by a high current. On the other hand, the M other coils 10 are connected to a load impedance Z2 that is practically constant, so that the alternating voltage VM1 at the terminals of these other coils remains practically constant (average value or RMS), even when the generator is being braked. This enables a voltage VM2 to be maintained at the terminals of the coils 10, 10' that is sufficient for powering the electronic circuit 2, even during braking.

The supply voltage $V_{dd}$ is thus maintained at a high value, preferably sufficient for powering the electronic circuit 2, even during periods of braking. However, the braking torque applied with a reduced number of coils is reduced. It is thus possible, thanks to this circuit, to brake for longer than if the braking were performed in a sudden manner with all the coils.

In one embodiment, the device is sized so that during a normal use of the watch, the rotor is braked permanently, or nearly permanently, with variable braking intensities, in order to make it turn at its nominal speed. This mode of operation makes it possible to save the energy available and thus the watch's running reserve, whilst limiting the risk of the electronic circuit stopping after a sudden braking. In this manner, such a permanent braking can serve to make the circuit and the system less sensitive to disturbances.

In another embodiment, braking cycles are applied to the rotor. Each cycle comprises for example a first period of duration T1 during which the rotor turns freely without being braked by the coils, and a second period of duration T2 during which the intensity of braking is controlled depending on the advance of the generator, so as to control the running of the watch. The watch thus advances at irregular speed, by accelerating during the periods of duration T1 and decelerating during the periods of duration T2. Tests have shown that, surprisingly, this mode of operation proves economical and enables the duration of the watch's running to be extended. It is possible to provide cycles comprising more than one braking period and/or more than one period of non-braking. It is possible to not interrupt fully the braking for the duration T1 but to reduce it or to apply constant braking.

The total duration T1+T2 of each cycle can be fixed. The ratio between T1 and T2 can vary so as to control the running of the watch by adjusting the duration of the braking. The duration of each cycle T1+T2 is advantageously sufficiently short so that the user only perceives marginally or not at all the irregular movement of the seconds' hand. This duration can be adjusted depending on the energy available in the barrel, so as to extend the duration of the cycle and to function in a more efficient manner when the barrel is discharging. A very discharged state of the barrel, shortly before the watch stops, can be indicated by means of a very long cycle duration T1+T2, for example greater than 3 seconds, preferably greater than 5 seconds for example 10 seconds. Such a duration produces a jerky movement of the seconds' hand, very perceptible, indicating to the user that it is necessary to rewind the watch.

Figure 3:
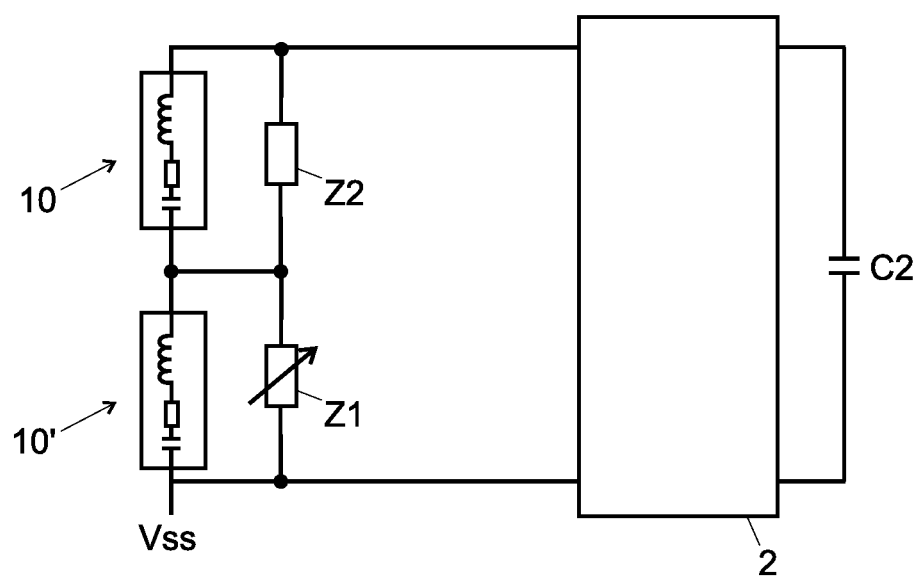
FIG. 3 is a simplified electric diagram of a variant electronic circuit according to one embodiment of the invention.

In FIG. 2, the fixed load impedance Z2 for the coils 10 and 10' powering the circuit is downstream of the rectifier-cum-multiplier 3, whilst the variable load impedance Z1 for the coils 10' that also serve for braking are upstream of this rectifier 3. It is also possible, as illustrated diagrammatically in FIG. 3, to provide a fixed load impedance Z2 for the coils 10 and 10' powering the circuit upstream of the rectifier-cum-multiplier 3; the other components of the circuit can be identical to those of FIG. 2.

In another variant embodiment, not illustrated, it is also possible to use all the coils 10, 10' for braking, but with different braking intensities. Thus, a first group of M coils can be connected to a first adjustable-value load impedance and a second group of N coils can be connected to a second adjustable-value load impedance, wherein the value of the first load impedance is different from the value of the second load impedance, at least at some instants. This enables for example all the impedances to be used for braking, but with different contributions. It is possible for example to use one of the groups of coils for braking only when an intensive braking is required, whilst the other group will be used more frequently and/or with higher braking intensities. It is also possible to have more than two groups of coils, with each group being connected, at least at certain instants, to different load impedances.

It is also possible to use distinct braking durations for different coils, during each period of the electric signal. For example, a first group of coils can be used for braking over a first duration, for example permanently, whilst another group of distinct coils can be used for braking only over a second duration that is nonzero but less than the first duration.

It is possible to interrupt the braking of all the coils during a brief instant each time the coils' output voltage is at the maximum, in order to make use of this voltage peak to charge the storage capacity C2. The duration of the interruption can vary according to the coils.

In another variant embodiment, not illustrated, the selection of coils 10' whose value is adjusted in order to vary the braking torque is modified. A first group of coils is used for braking at a first instant and a second group is used for braking at a second instant.

Figure 4:
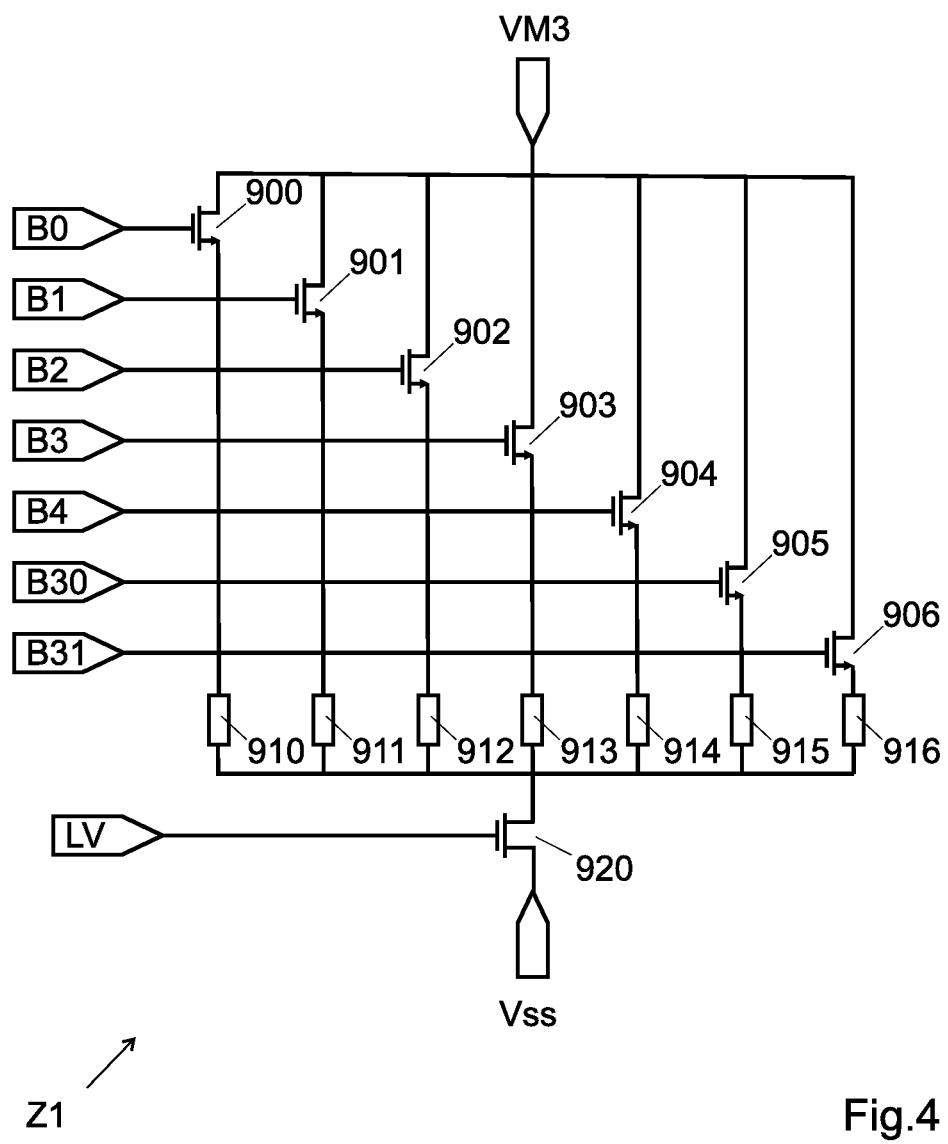
FIG. 4 illustrates diagrammatically an adjustable load impedance Z1 according to one embodiment of the invention.

FIG. 4 illustrates an example of adjustable-value load impedance Z1 according to one embodiment of the invention. The value of the impedance Z1 depends on the digital signals B0-B31 of the counter 22 (or of the digital signals derived from the signals at the output of the counter). As previously mentioned, the impedance Z1 can be connected directly to the terminals of the braking coils 10', upstream of the rectifier 2. It is also possible to provide a load impedance for braking downstream of a rectifier, and/or several variable-value impedances allocated individually to braking with the different braking coils 10'.

The impedance Z1 comprises in this example of embodiment several resistors 900 to 906, for example resistors integrated in an integrated circuit. Each resistor 900 to 906 is connected serially with a switch 910 to 916 respectively. The switches 910 to 916 are controlled by the signals B0 to B4 and B30-B31 coming from the counter 22 (or from a logic upstream of this counter 22). The value of the different resistors 910 to 916 is inversely proportional to the significance of the bits B0 to B31, so that the activation of the bit B31, for example, produces a braking significantly higher than the activation of the bit B0.

The switches 900 to 906 can be constituted by field-effect transistors of type N that are blocked when the grid voltage is zero and open if this voltage takes on the logic value 1.

An additional field-effect transistor 920 can be connected serially with the whole of the resistors, in order to increase the impedance when this transistor is blocked and no braking is desired. This transistor 920 can be for example a P-channel transistor controlled by an active signal LV (at 0) for example when starting up, or at other instants when the braking needs to be interrupted.

In order to ensure a clean switching of the transistors 900 to 906 and 920, and clearly differentiated open resp. blocked states, it is possible to use voltage multipliers in order to multiply the voltages applied to the grids of these transistors.

REFERENCE NUMBERS USED IN THE FIGURES

10 Stator coils serving only for the electric power supply
10' Stator coils serving for braking and powering
12 Magnetic rotor
120 Arbor of the rotor
2 Electronic regulating circuit
20 Hysteresis comparator—of the system for counting pulses from the generator
21 Anticoincidence circuit
22 Counter of the system for counting pulses from the generator and of the system for counting pulses from the quartz oscillator
23 Quartz
24 Oscillator
25 Frequency divider
3 Rectifier and voltage multiplier
900:906 Switches (N-FET transistors)
910:916 Integrated resistors
920 Switch (P-FET transistor)
B0:B31 Control signals of the impedance Z1
C1 First capacity
C2 Second storage capacity
C3 Third capacity
D1 First diode of the rectifier
D2 Second diode of the rectifier
D3 Third diode of the rectifier
LV Signal to interrupt the braking
Z1 First load impedance (adjustable)
Z2 Second load impedance (fixed or adjustable)
VM1 Voltage at the terminals of the coils 10
VM2 Voltage at the terminals of the coils 10+10'
VM3 Voltage at the terminals of the coils 10'
Vdd Voltage at the output of the rectifier-multiplier
Vss Earth voltage

The invention claimed is:

1. Regulating member for a wristwatch, comprising:
   a generator provided with a rotor and a stator with M+N coils, M and N being each a whole number greater than or equal to 1; and
   an electronic regulating circuit arranged for controlling the braking of the rotor, characterized in that the circuit is arranged for controlling the braking exerted by the M coils differently from the braking exerted by the N coils.

2. The regulating member according to claim 1, wherein M and N are both greater than or equal to 2.

3. The regulating member according to claim 1, wherein the electronic regulating circuit comprises a first adjustable-value load impedance in order to adjust the current in the N of said M+N coils and thus the rotation speed of the rotor.

4. Regulating member according to claim 3, wherein said first adjustable-value load impedance is connected in parallel with said N coils.

5. Regulating member according to claim 4, wherein said M coils are not connected in parallel with said first adjustable-value load impedance.

6. Regulating member according to claim 3, wherein the first adjustable-value load impedance is connected upstream of the electronic regulating circuit.

7. Regulating member according to claim 3, wherein said first adjustable-value load impedance comprises several discrete impedances that can be individually selected in order to control the value of the first load impedance between several discrete values.

8. The regulating member according to claim 1, characterized by a second fixed-value load impedance, wherein said second load impedance is connected at least to said M coils.

9. Regulating member according to claim 8, wherein the second fixed-value load impedance is traversed by a current determined by the whole of said M+N coils.

10. Regulating member according to claim 9, wherein the second fixed-value load impedance is connected downstream of said electronic regulating circuit.

11. The regulating member according to claim 1, wherein M and N are fixed and do not vary during the operation of the generator.

12. The regulating member according to claim 1, wherein the electronic regulating circuit is arranged for varying M and N during the operation of the generator, so as to vary the number of coils assigned to controlling the braking.

13. Regulating member according to claim 1, wherein said M coils are connected serially with said N coils, wherein the electronic regulating circuit is powered by the voltage at the terminals of the M+N coils.

14. Regulating member according to claim 1, wherein said electronic regulating circuit is arranged for controlling the braking of the rotor by applying braking cycles, wherein each cycle comprises a first braking period with a fixed braking intensity and a second braking period with a braking intensity that depends on the advance of the rotor.

15. Regulating member according to claim 14, wherein said electronic regulating circuit is arranged for modifying the braking intensity during said second period and for keeping a braking intensity constant during said first period.

16. Regulating member according to claim 15, wherein said electronic regulating circuit is arranged for keeping a braking intensity at zero during said first period.

17. Regulating member according to claim 14, wherein said electronic regulating circuit is arranged for modifying the duration of said cycles.

18. Regulating member according to claim 17, wherein said electronic regulating circuit is arranged for indicating the running reserve by varying the duration of said cycles according to the energy available in a barrel.

19. Regulating member according to claim 1, wherein said electronic regulating circuit comprises a quartz oscillator, a system for counting pulses (down) generated from the quartz oscillator and pulses (up) generated from signals at the output of said coils, and a control system of said first load impedance in order to adjust the value of said first load impedance depending on the counting system.

20. Regulating member according to claim 1, wherein said coils have an ovoid shape.

21. Watch movement comprising a regulating member according to claim 1.

22. Regulating member for a wristwatch, comprising:
a generator provided with a rotor and a stator with M+N coils, M and N being each a whole number greater than or equal to 1; and
an electronic regulating circuit arranged for controlling the braking of the rotor, characterized in that the circuit is arranged for controlling the braking exerted by the M coils differently from the braking exerted by the N coils,
wherein the electronic regulating circuit comprises a first adjustable-value load impedance in order to adjust the current in the N of said M+N coil and thus the rotation speed of the rotor.

* * * * *